United States Patent [19]
Ziegler

[11] Patent Number: 4,487,389
[45] Date of Patent: Dec. 11, 1984

[54] WALL MOUNTED DEVICE FOR SUPPORTING ARTICLES

[76] Inventor: Donald H. Ziegler, Rte. 1, School Rd., Appleton, Wis. 54915

[21] Appl. No.: 442,289

[22] Filed: Nov. 17, 1982

[51] Int. Cl.³ .............................................. A47G 29/00
[52] U.S. Cl. ...................................... 248/282; 211/96; 248/415; 248/425
[58] Field of Search ............... 248/282, 284, 415, 425, 248/145, 416, 283; 108/139; 211/96, 95

[56] References Cited

U.S. PATENT DOCUMENTS

| | | | |
|---|---|---|---|
| 1,525,533 | 2/1925 | Brown | 248/282 |
| 3,376,007 | 4/1968 | Chesterley | 248/282 |
| 3,796,170 | 3/1974 | Viera | 108/139 |
| 3,870,262 | 3/1975 | Manning | 248/145 |
| 3,896,576 | 7/1975 | Wolf et al. | 248/282 |
| 4,226,398 | 10/1980 | Freber | 248/415 |
| 4,363,460 | 12/1982 | Carroll | 248/415 |
| 4,410,159 | 10/1983 | McVicker et al. | 248/349 |

*Primary Examiner*—William H. Schultz
*Assistant Examiner*—Ramon O. Ramirez
*Attorney, Agent, or Firm*—Andrus, Sceales, Starke & Sawall

[57] ABSTRACT

A device attachable to a wall for supporting relatively heavy articles such as television sets. The device includes a bracket mountable to the wall, a supporting arm pivotally connected at its inner end to the bracket and extending outwardly therefrom, and an article supporting platform rotatably mounted at the outer end of the arm. The bracket and arm are constructed of wood and include metal angle members and plates, respectively, for reinforcing the pivotal connection of the arm to the bracket. The arm has a wood veneer layer to cover the reinforcing plates and the bracket includes removable wood housings to cover the reinforcing angle members to provide a device having an all-wood appearance.

19 Claims, 4 Drawing Figures

U.S. Patent   Dec. 11, 1984   4,487,389
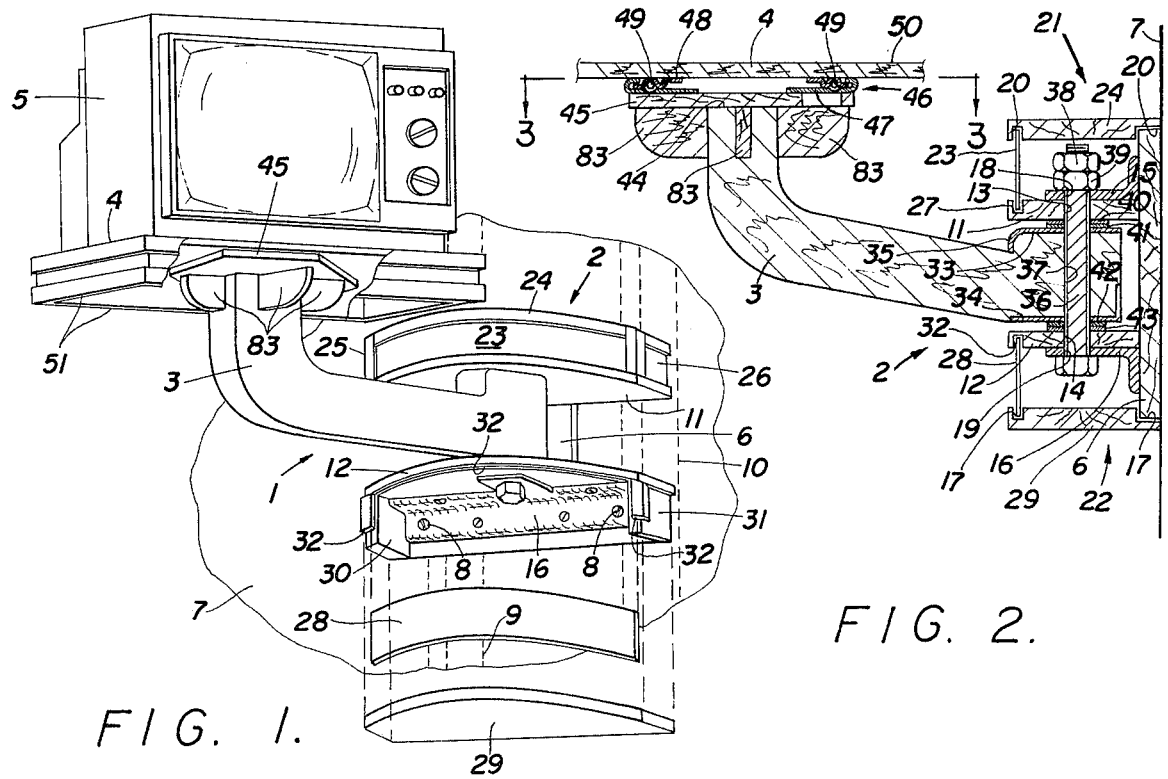
FIG. 1.
FIG. 2.
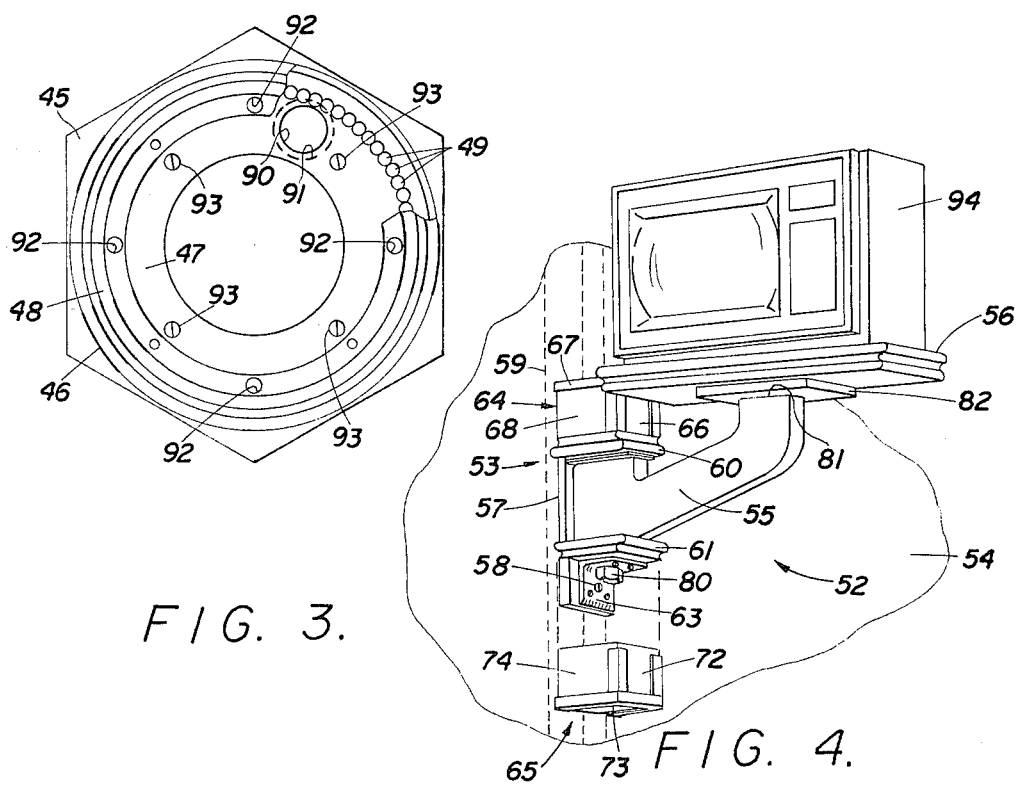
FIG. 3.
FIG. 4.

WALL MOUNTED DEVICE FOR SUPPORTING ARTICLES

BACKGROUND OF THE INVENTION

The present invention relates to devices for supporting articles, and more particularly to a wall mounted device for supporting relatively heavy articles.

Various wall mounted devices for pivotally mounting articles relative to the surface of the wall are known and used in homes, offices, restaurants, taverns or other places. For example, one type of device includes a bracket mountable on the wall and an arm pivotally mounted on the bracket and extending outwardly therefrom which supports relatively light loads, such as flower pots. This type of device, however, is relatively simple in construction because the anticipated load to be carried by the device is light. Thus, the device itself may be relatively light in weight and easy to install.

When it is desired to support heavier articles, such as televisions or microwave ovens, a mounting device of necessity becomes heavier and more complex. With such heavier articles, it is necessary to insure that the supporting device is securely anchored to the wall and is itself constructed of sturdy materials. One such device is shown in U.S. Pat. No. 3,796,170, which shows a wall mounted device for supporting heavy articles which includes a platform pivotally mounted on a bracket which is secured to a supporting wall. Such a device, however, is preferably constructed of metal pieces which are not particularly aesthetically pleasing. In addition, the platform shown in this patent is not rotatable with respect to the pivoting frame and thus the position of the article supported thereon may be limited.

It is thus desirable to provide a wall mounted device for supporting relatively heavy articles that is not only constructed of wood to provide an aesthetically pleasing appearance, but is also constructed in a sturdy manner to securely fasten the article to the wall so that it may be swung freely to any desired position.

SUMMARY OF THE INVENTION

A device attachable to a vertical surface, such as a wall, for supporting a relatively heavy article thereon. The device includes a bracket mountable to the vertical surface, a supporting arm pivotally mounted at its inner end on the bracket and extending outwardly therefrom, and an article supporting platform rotatably mounted at the outer end of the arm. The arm swings freely with respect to the vertical surface and the platform rotates freely on the arm to provide a device which can swing over a wide angle to position the article in any desired location.

The bracket is constructed of wood, such as veneered plywood, and is reinforced by a pair of metal angle members to lend strength to the bracket. The supporting arm is also constructed of wood and is reinforced by a pair of metal plates attached to its inner end to insure the structural integrity of the arm. The metal angle members are hidden from view by being enclosed within removable decorative wood housings and the metal reinforcing plates are covered with a wood veneer layer to provide an all-wood appearance.

The platform is rotatably mounted on the outer end of the arm by means of a swivelling turntable. The article, for example a television set, may thus be swung or pivoted between an angle of about 180° from side-to-side and may be rotated 360° on the platform to any desired position with respect to the wall to cover a wide visual angle.

In one form, the bracket is mountable to a single stud of the wall for lighter articles of up to about 30 lbs., and in another form the bracket is attachable to a pair of adjacent studs of the wall for heavier articles of up to about 100 lbs.

The present invention thus provides a device which is attachable to a vertical surface for supporting relatively heavy articles which is sturdy in construction, aesthetically pleasing, and enables the supported article to be freely moved to any desired position with respect to the vertical surface.

Other objects and advantages will appear in the course of the following description.

BRIEF DESCRIPTION OF THE DRAWINGS

The drawings illustrate the best mode presently contemplated of carrying out the invention.

In the drawings:

FIG. 1 is a partially exploded perspective view of the supporting device of the present invention;

FIG. 2 is a view in section taken longitudinally through the device shown in FIG. 1;

FIG. 3 is a plan view with parts broken away taken along the plane of the line 3—3 in FIG. 1; and FIG. 4 is a partially exploded perspective view of a second embodiment of the supporting device of the present invention.

DESCRIPTION OF THE PREFERRED EMBODIMENTS

Referring now to the drawings, FIGS. 1 and 2 show a supporting device, generally designated by the numeral 1, constructed in accordance with the principles of the present invention. The supporting device 1 includes a bracket 2 mountable to a vertical surface, such as a wall 7, a supporting arm 3 pivotally mounted at its inner end to bracket 2 and extending outwardly therefrom, and an article supporting platform 4 rotatably mounted at the outer end of arm 3. The device 1 supports a relatively heavy article, up to about 100 lbs., such as a television 5 so that it may be pivoted by arm 3 with respect to wall 7 and may be rotated on platform 4 with respect to arm 3.

The bracket 2 includes a base plate 6 having a back side abuttable against the surface of a wall 7 to be vertically oriented. Base plate 6 is shaped in the form of an I, and is preferably constructed of one inch plywood. Base plate 6 includes a pair of upper openings and a pair of lower openings formed therethrough at opposite ends of its cross portions, through which upper and lower mounting screws 8 extend to securely attach bracket 2 to a pair of adjacent studs 9 and 10 of wall 7. Upper and lower mounting plates 11 and 12 project substantially horizontally from the front side of base plate 6. Plates 11 and 12 are vertically spaced apart a sufficient distance so that the inner end of arm 3 is receivable therebetween. Plates 11 and 12 include centrally located openings 13 and 14, respectively, formed therethrough for use in providing the pivotal connection of arm 3 to bracket 2, as will be hereinafter more fully described. Bracket 2 also includes upper and lower metal angle members 15 and 16 for reinforcing mounting plates 11 and 12. The upper angle member 15 has one leg fixed or screwed to the upper surface of upper mounting plate 11 and its other leg affixed or screwed to the front side of the upper cross portion of base plate 6. The upwardly directed leg of member 15 includes a pair of spaced apart openings formed therethrough in alignment with the openings in the upper cross portion of plate 6 for receiving screws 8, and the outwardly directed leg of member 15 includes an opening 18 in alignment with the opening 13 in plate 11. The lower angle member 16 has its outwardly directed leg affixed or screwed to the lower surface of lower mounting plate 12 and its downwardly directed leg affixed or screwed to the front side of the lower cross portion of base plate 6. The outwardly directed leg of member 16 includes an opening 19 in alignment with the opening 14 in plate 12, and the downwardly directed leg of angle member 16 has a pair of spaced apart openings formed therethrough in alignment with the openings in the lower cross portion of plate 6 for receiving the lower mounting screws 8. The angle members 15 and 16 thus provide a means for reinforcing mounting plates 11 and 12 to provide a sturdy bracket 2 for mounting to wall 7.

Bracket 2 also includes a pair of decorative wood housings 21 and 22 removably attachable to mounting plates 11 and 12 for covering or hiding metal angle members 15 and 16. The housings 21 and 22 may be constructed of wood having substantially the same color and grain as the wood of base plate 6 and mounting plates 11 and 12. Housings 21 and 22 may also be of plywood covered with a wooden veneer layer having substantially the same color and grain as the wood of base plate 6 and mounting plates 11 and 12. The upper housing 21 includes a removable front wall 23 and top wall 24, and a pair of side walls 25 and 26 affixed to the side edges of mounting plate 11 and the upper cross portion of base plate 6. The lower and side edges of front wall 23 are slidably receivable in groove 27 formed in the upper surface of mounting plate 11 and in the side walls 25 and 26. The top edges of front wall 23, side walls 25 and 26, and the upper cross portion of base plate 6 are slidably received within a groove 20 formed in the lower surface of top wall 24 along its perimeter. These edges are frictionally engaged within the grooves 20 and 27 so that housing 21 is secured in place, but may be removable when desired. The lower housing 22 includes a removable front wall 28 and bottom wall 29, and a pair of side walls 30 and 31 affixed to the side edges of mounting plate 12 and the lower cross portion of base plate 6. The top and side edges of front wall 28 are slidably received within a groove 32 formed in the lower surface of mounting plate 12 and in the side walls 30 and 31. The bottom edges of front wall 28, side walls 30 and 31, and the lower cross portion of base plate 6 are slidably received within a groove 17 formed in the upper surface of bottom wall 29 along its perimeter. These edges are frictionally engaged in grooves 17 and 32 to releasably secure housing 22 to plate 12.

Supporting arm 3 is constructed of solid wood, such as oak or maple, or may be constructed of plywood having an oak or maple veneer layer covering the plywood. The inner end of arm 3 is positioned between the mounting plates 11 and 12 and includes means for reinforcing its inner end to provide a sturdy construction. As shown best in FIG. 2, this reinforcing means includes a first reinforcing metal plate 33 attached to the upper surface of the inner end of arm 3 and a second reinforcing metal plate 34 attached to the lower surface of the inner end of arm 3. The reinforcing plates 33 and 34 are covered by a wood veneer layer 35 having substantially the same color and grain as the wood of arm 3.

Arm 3 is pivotally connected to bracket 2 by means of a pin or throughbolt 36 extending vertically through the openings 19 and 14 in angle member 16 and plate 12, respectively. In order to accommodate bolt 36, the inner end of arm 3 also includes an opening 37 which extends through reinforcing plates 33 and 34. Opening 37 is spaced from the extreme inner surface of arm 3 so that when in registry with the openings 18, 19, 13 and 14, sufficient clearance is provided between base plate 6 of bracket 2 and arm 3 to permit 180° rotation of arm 3 with respect to wall 7 on bracket 2. Through bolt 36 is secured in place by means of a pair of nuts 38 and 39. Upper nut 38 prevents the loosening of lower nut 39 as arm 3 pivots, as in conventional.

Bearing means is also provided between the inner end of arm 3 and the upper and lower mounting plates 11 and 12 to permit arm 3 to easily pivot or swing on bolt 36. The bearing means includes an upper bearing disposed between the upper surface of arm 3 and the lower surface of upper plate 11 which includes a pair of washers 40 and 41. One washer 40 is affixed to the lower surface of mounting plate 11 and the other washer 41 is affixed to the upper surface of the inner end of arm 3 so that when arm 3 rotates washers 40 and 41 rotate with respect to one another to provide a bearing surface. The lower bearing also includes a pair of washers 42 and 43 with washer 42 affixed to the lower surface of arm 3 and washer 43 affixed to the upper surface of mounting plate 12. Thus, as arm 3 pivots washers 42 and 43 rotate with respect to one another and provide a bearing surface which also aids in the movement of arm 3.

Supporting arm 3 extends substantially horizontally from wall 7 and ends at its outer end with an upwardly facing, horizontally extending abutment surface 44 which carries the platform 4. A supporting plate 45 is mounted on abutment surface 44 and supports a swivel means which provides the rotational connection between the platform 4 and arm 3. Plate 44 is supported by four braces 83 which are equally spaced from one another and extend between arm 3 and the lower surface of plate 44. The swivel means includes a turntable 46 having an annular plate 47 affixed to the top of plate 45 and a second annular plate 48 affixed to the bottom of platform 4. Ball bearings 49 are interposed between plates 47 and 48 to provide relative rotation therefor. As shown in FIG. 1, arm 3 extends outwardly from wall 7 a sufficient distance so as to permit 360° rotation of platform 4 on its outer end.

Platform 4 is constructed of wood or of plywood with a veneer covering having substantially the same color and grain as the wood of bracket 2 and arm 3. Platform 4 includes an upper planar surface 50 for supporting the television 5 in a horizontal manner, and includes a downwardly directed flange 51 along its perimeter which tends to hide from sight the turntable 46.

In order to mount device 1 on wall 7, the front wall 23 and top wall 24 of upper housing 21 as well as the front wall 28 and bottom wall 29 of lower housing 22 are detached from mounting plates 11 and 12 of bracket 2 and the upper and lower mounting screws 8 are inserted through angle members 15 and 16 into the studs 9 and 10 of wall 7. The housings 21 and 22 are then reassembled in order to cover angle members 15 and 16. In order to mount platform 4 on the end of arm 3, the lower plate 47 of turntable 46 is first affixed or screwed to the upper surface of supporting plate 45 by screws 93 so that an opening 90 therein is in alignment with an access opening 91 in plate 45, as seen best in FIG. 3. In order to attach platform 4 to the upper annular plate 48 of turntable 46, the upper plate 48 is rotated until a screw hole 92 is in registry with the openings 90 and 91. A screw may then be turned into the lower surface of platform 4 through hole 92. Platform 4 and upper annular plate 48 may then be rotated until the next succeeding screw hole 92 in plate 48 is in registry with the openings 90 and 91. Another screw may then be turned into the lower surface of platform 4. This procedure is repeated until platform 4 is securely mounted to plate 48 of turntable 46 so as to provide a 360° rotational mounting for platform 4.

Referring now to FIG. 4, there is shown a second embodiment of the supporting device of the present invention for use with lighter articles weighing up to about 30 lbs. The device of the second embodiment, designated by the numeral 52, is generally similar to device 1 of the first embodiment. The device 52 includes a bracket 53 mountable to a wall 54, a supporting arm 55 pivotally mounted at its inner end on bracket 53 and extending outwardly therefrom, and a platform 56 rotatably mounted at the outer end of arm 55 for supporting an article such as a small microwave oven 94.

Bracket 53 includes a base plate 57 having a backside abuttable against the surface of wall 54 to be vertically orientated. Base plate 57 is rectangular in shape and is preferably constructed of 1" plywood. Base plate 57 includes a pair of openings formed therethrough at its opposite ends (only one being shown in FIG. 4) through which bolts or screws 58 may extend to securely attach bracket 53 to wall 54. The screws 58 are vertically spaced apart from one another and are attachable to a stud 59 of wall 54.

Upper and lower mounting plates 60 and 61 project substantially horizontally from the front side of base plate 57. Plates 60 and 61 are vertically spaced apart a sufficient distance so that the inner end of arm 55 is receivable therebetween. Plates 60 and 61 include central openings formed therethrough in vertical alignment with one another for use in providing the pivotal connection of arm 55 to bracket 53, as will hereinafter be more fully described. Bracket 53 also includes a lower metal angle member 62 for reinforcing mounting plate 61, and an upper metal angle member (not shown) for reinforcing plate 60. The upper angle member has one leg fixed or screwed to the upper surface of upper mounting plate 60 and its other leg affixed or screwed to the front side of base plate 57. The upwardly directed leg of the upper angle member includes an opening formed therethrough in alignment with the upper opening in base plate 57 for receiving the upper mounting screw 58, and the outwardly directed leg of the upper angle member includes an opening in alignment with the opening in upper mounting plate 60. The lower angle member 63 has its outwardly directed leg fixed or screwed to the lower surface of lower mounting plate 63 and its downwardly directed leg fixed or screwed to the front side of base plate 57. The outwardly directed leg of member 63 includes a central opening in alignment with the central opening in lower mounting plate 61, and the downwardly directed leg of angle member 63 has an opening therethrough in alignment with the lower opening in plate 57 for receiving the lower mounting screw 58. The metal angle members thus provide means for reinforcing mounting plates 60 and 61 to provide a sturdy bracket 53 for mounting to wall 54.

Bracket 53 also includes a pair of decorative wood housings 64 and 65 removably attachable to mounting plates 60 and 61 for covering or hiding the metal angle members. Housings 64 and 65 may be constructed of wood having substantially the same color and grain as the wood of base plate 57 and mounting plates 60 and 61, or may be plywood covered with a layer of wood veneer. Upper housing 64 includes a front wall 66, top wall 67, and a pair of side walls 68 interconnecting the front wall 66 and top wall 67. The lower edges of front wall 66 and side walls 68 are slidably receivable in a groove (not shown) formed in the upper surface of mounting plate 60. The lower edges of walls 66, and 68 are frictionally engaged within the groove so that housing 64 is secured in place, but may be removable when desired. The lower housing 65 includes a front wall 72, a bottom wall 73, and a pair of side walls 74 interconnecting the front wall 72 and bottom wall 73. The upper edges of front wall 72 and side walls 74 are slidably receivable in a groove (not shown) formed in the lower surface of mounting plate 61. The upper edges of walls 72, and 74 are frictionally engaged within the groove so that housing 65 is secured in place, but may be removable when desired.

Supporting arm 55 is constructed of solid wood, such as oak or maple, or may be constructed of plywood having an oak or maple veneer layer covering the plywood. The inner end of arm 55 is positioned between mounting plates 60 and 61 and includes means for reinforcing its inner end to provide a sturdy construction. This reinforcing means is similar to that for the first embodiment and includes an upper reinforcing metal plate attached to the upper surface of the inner end of arm 55 and a lower reinforcing metal plate attached to the lower surface of the inner end of arm 55. The reinforcing plates are covered by a veneer layer composed of wood having substantially the same color and grain as the wood of arm 55.

The pivotal connection of arm 55 to bracket 53 is provided by a pin or through bolt 80 which passes through the metal angle members, mounting plates 60 and 61, the metal reinforcing plates and the inner end of arm 55. Bolt 80 is secured in place in a manner similar to that shown in FIG. 2 for the first embodiment. Additionally, arm 55 rides on upper and lower bearings located on bolt 80 between the inner end of arm 55 and mounting plates 60 and 61. These upper and lower bearings consist of washers which slidably rotate with respect to one another in the same manner as that described for the first embodiment and as shown in FIG. 2.

The outer end of supporting arm 55 ends in an upwardly facing horizontally extending abutment surface 81 which supports a plate 82 which carries platform 56. A swivel means or turntable (not shown) similar to that described for the first embodiment is mounted on plate 82 and provides the rotation mounting for platform 56. Platform 56 includes an upper planar surface for receiving and supporting the microwave oven 94 in a horizontal position.

In order to mount device 52 on wall 54, upper housing 64 as well as lower housing 65 are detached from mounting plates 60 and 61 of bracket 53 and the upper and lower mounting screws 58 are inserted through the metal angle members into the stud 59 of wall 54. Housings 64 and 65 are then reassembled in order to cover the angle members. Platform 56 may then be mounted on the outer end of arm 55 in a manner substantially as described in connection with the first embodiment.

The present invention thus provides a device attachable to a vertical surface, such as a wall, for pivotally and rotatably supporting an article. Various modifications and/or changes may be made to the embodiments specially illustrated and described without departing from the invention. For example, various types of swivel means may be utilized as long as it provides rotation for the article on its supporting arm.

Various modes of carrying out the invention are contemplated as being within the scope of the following claims particularly pointing out and distinctly claiming the subject matter which is regarded as the invention.

I claim:

1. A device attachable to a vertical surface for supporting an article, comprising:
   a bracket mountable to the vertical surface;
   a supporting arm pivotally mounted at its inner end on said bracket and extending outwardly therefrom, said arm includes reinforcing means at its inner end; and
   an article-supporting platform rotatably mounted at the outer end of said arm.

2. The device of claim 1, wherein said bracket includes upper and lower spaced apart angle members each having a first leg adapted to be secured to the vertical surface and a second leg projecting from the surface, and said pivotal connection is provided by a pin extending vertically through said second legs and the inner end of said arm.

3. The device of claim 2, further including bearing means disposed between said upper angle member and said arm and between said lower angle member and said arm.

4. The device of claim 1, wherein said reinforcing means includes a first reinforcing plate attached to the upper surface of said inner end and a second reinforcing plate attached to the lower surface of said inner end.

5. The device of claim 1, wherein the outer end of said mounting arm includes an upwardly facing, horizontally extending abutment surface which carries said platform.

6. The device of claim 5, wherein said abutment surface is spaced from said vertical surface a distance sufficient to permit 360° rotation of said platform.

7. The device of claim 5, wherein said rotatable connection includes swivel means disposed between said abutment surface and said platform.

8. The device of claim 7, wherein said swivel means includes a first plate affixed to said abutment surface, a second plate affixed to the bottom of said platform, and bearing means interposed between said first and second plates to provide relative rotation therefor.

9. The device of claim 2, wherein said vertical surface is a wall and each angle member of said bracket is attachable to a pair of adjacent studs of said wall.

10. A device attachable to a vertical surface for supporting an article, comprising:
    a bracket mountable to the vertical surface, said bracket including a base plate having a first side adapted to be secured against the vertical surface, upper and lower vertically spaced apart mounting plates projecting substantially horizontally from a side opposite the first side, a first reinforcing angle member having one leg affixed to the upper surface of said upper mounting plate and its other leg affixed to said opposite side of said base plate, and a second reinforcing angle member having one leg affixed to the lower surface of said lower mounting plate and its other leg affixed to said opposite side of said base plate, and each of said mounting plates and angle members having an opening formed therethrough in generally vertically aligned relationship;
    a supporting arm pivotally mounted at its inner end on said bracket and extending outwardly therefrom, said inner end receivable between said mounting plates and including reinforcing means having a first reinforcing plate attached to the upper surface of said inner end and a second reinforcing plate attached to the lower surface of said inner end, and an opening formed through said reinforcing plates and the inner end of said arm in generally vertically aligned relationship with the openings in said mounting plates and angle members, said arm having an upwardly facing, horizontally extending abutment surface at its outer end;
    means for pivotally mounting said arm to said bracket, said means including a pin extending through the openings in said mounting plates and angle members and through the opening in said reinforcing plates and inner end of said arm;
    a substantially horizontally extending article-supporting platform rotatably mounted at the outer end of said arm on said abutment surface; and
    swivel means disposed between said abutment surface and said platform for providing relative rotation between said platform and said arm.

11. The device of claim 10, further including bearing means disposed between the inner end of said arm and said upper and lower mounting plates, each of said bearing means includes a pair of washers on said pin, one of said washers affixed to the inner end of said arm and the other of said washers affixed to said mounting plate.

12. The device of claim 10, wherein said vertical surface is a wall, the base plate of said bracket is I-shaped, and each angle member of said bracket is attachable to a pair of adjacent studs of said wall.

13. The device of claim 10, wherein the arm, base plate and mounting plates are composed of wood, and the angle members and reinforcing plates are composed of metal.

14. The device of claim 13, further including decorative wood housings removably attachable to said mounting plates for covering said angle members, and a veneer layer covering said reinforcing plates, said housings and veneer layer composed of wood having substantially the same color and grain as the wood of said arm, base plate and mounting plates.

15. A device attachable to a vertical surface for supporting an article, comprising:
    a bracket mountable to the vertical surface;
    a supporting arm pivotally mounted at its inner end on said bracket and extending outwardly therefrom, said arm includes reinforcing means at its inner end having a first reinforcing plate attached to the upper surface of said inner end and a second reinforcing plate attached to the lower surface of said inner end;
    means for pivotally mounting said arm to said bracket, said means including a vertically orientated pin extending through said reinforcing plates and inner end of said arm; and an article-supporting platform rotatably mounted at the outer end of said arm.

16. The device of claim 15, wherein said reinforcing plates are metal and said arm is wood, and further including a wood veneer layer convering said reinforcing plates, said layer having substantially the same color and grain as the wood of said arm.

17. A device attachable to a vertical surface for supporting an article, comprising:
 a bracket mountable to the vertical surface, said bracket including a wood base plate having a first side adapted to be secured against the vertical surface, upper and lower vertically spaced apart wood mounting plates projecting substantially horizontally from a side opposite the first side, a first reinforcing metal angle member having one leg affixed to the upper surface of said upper mounting plate and its other leg affixed to said opposite side of said base plate, and a second reinforcing metal angle member having one leg affixed to the lower surface of said lower mounting plate and its other leg affixed to said opposite side of said base plate;
 a supporting arm pivotally mounted at its inner end on said bracket and extending outwardly therefrom, said inner end receivable between said mounting plates and said arm being composed of wood;
 an article-supporting platform rotatably mounted at the outer end of said arm; and
 a pair of decorative wood housings removably attachable to said mounting plates for covering said angle members, said housings having substantially the same color and grain as the wood of said arm, base plate and mounting plates.

18. The device of claim 17, wherein said lower housing includes a front wall, a bottom wall and a pair of side walls interconnecting the front and bottom walls, the top edges of the front and side walls of said lower housing being slidably receivable within a groove formed in the lower mounting plate, and said upper housing includes a front wall, a top wall and a pair of side walls interconnecting the front and top walls, the bottom edges of the front and side walls of said upper housing being slidably receivable within a groove formed in the upper mounting plate.

19. The device of claim 17, wherein said vertical surface is a wall, the base plate of said bracket is I-shaped, each angle member of said bracket is attachable to a pair of adjacent studs of said wall, said upper mounting plate includes a pair of side walls extending upwardly from opposite ends thereof, said lower mounting plate includes a pair of side walls extending downwardly from opposite ends thereof, and said housings include an upper housing having a front wall with its bottom edge slidably receivable within a groove formed in the upper surface of said upper mounting plate and side edges slidably receivable within corresponding grooves formed in said upper side walls and a top wall having a groove formed along its perimeter for slidably receiving the top edges of said front and side walls and said base plate, and a lower housing having a front wall with its top edge slidably receivable within a groove formed in the lower surface of said lower mounting plate and side edges slidably receivable within corresponding grooves formed in said lower side walls and a bottom wall having a groove formed along its perimeter for slidably receiving the bottom edges of said front and side walls and said base plate.

* * * * *